United States Patent [19]

Walker

[11] 4,343,366

[45] Aug. 10, 1982

[54] ROTOR TILLER WITH REVERSELY DIRECTED PLOW

[76] Inventor: Robert Walker, 5422 Hawthorne Pl., Washington, D.C. 20016

[21] Appl. No.: 189,807

[22] Filed: Sep. 22, 1980

[51] Int. Cl.³ .............................................. A01B 49/02
[52] U.S. Cl. ........................................ 172/41; 172/71
[58] Field of Search ........................ 172/41, 42, 43, 63, 172/71, 72, 112, 80; D15/12

[56] References Cited

U.S. PATENT DOCUMENTS

| | | | |
|---|---|---|---|
| D. 252,879 | 9/1979 | Lessig et al. | D15/12 |
| 2,888,084 | 5/1959 | Trecker | 172/41 |
| 3,502,153 | 3/1970 | Bradshaw et al. | 172/43 |
| 3,807,506 | 4/1974 | Penley | 172/42 |
| 3,978,929 | 9/1976 | Clark | 172/42 |
| 4,049,059 | 9/1977 | Weibling | 172/41 X |

FOREIGN PATENT DOCUMENTS

| | | | |
|---|---|---|---|
| 730698 | 1/1943 | Fed. Rep. of Germany | 172/42 |
| 2226359 | 12/1973 | Fed. Rep. of Germany | 172/80 |
| 882733 | 3/1943 | France | 172/41 |
| 1189647 | 3/1959 | France | 172/112 |

*Primary Examiner*—Richard T. Stouffer
*Attorney, Agent, or Firm*—Pearson & Pearson

[57] ABSTRACT

A handle-guided, walking type, power-operated rotor tiller, having blades for digging a path in crusted soil while propelling itself along a path is provided with a plow, mounted in rear of the rotor blades to follow in the cultivated path with minimum resistance to advance of the tiller. The plow faces rearwardly and has an upstanding, trailing, plowing edge, and an upstanding trailing plowing surface, obliqued to the path of the tiller, to plow a furrow only when the tiller moves reversely along it's path.

6 Claims, 4 Drawing Figures

ROTOR TILLER WITH REVERSELY DIRECTED PLOW

BACKGROUND OF THE INVENTION

It has heretofore been proposed to provide a walking cultivator of the power operated, handle guided type with rotary blades for cultivating a swath, or path, in crusted soil while also advancing the device. Usually such garden tillers have included a drag stake, or brake tooth, extending downwardly from the frame, in rear of the motor and rotating blades, and swiveled, to assist in control during advance as shown in U.S. Pat. No. 2,614,474 of Oct. 21, 1952 to Merry and in U.S. Pat. No. 3,040,590 of June 26, 1962 to Smithburn.

It has also been proposed to provide such a walking cultivator, or rotor tiller with a side mounted plow, arranged to plow a furrow alongside, and simultaneously with the cultivation of a swath in the ground, as the tiller advances under power. This is disclosed in U.S. Pat. No. 3,978,929 to Clark of Sept. 7, 1976.

However, all of the above expedients tend to exert a braking force on the roto tiller at the same time that the rotor blades are seeking to dig into crusted soil, thereby dissappating energy and straining the motor of the device.

SUMMARY OF THE INVENTION

In this invention the handle-guided, power-operated rotor tiller is provided with the conventional rotatable blades for digging a cultivated swath in crusted soil while propelling the tiller unidirectionally in a path of advance. The tiller preferably also has a conventional foot guard which follows along behind the rotating blades and frame, and is of skeletonized metal construction, but it is devoid of any swiveled drag brake, and devoid of any plow structure which might resist its forward advance.

However, the tiller of the invention is provided with an easily attachable and detachable plow, preferably of curved sheet metal, mounted on the frame in rear of the rotating tines and having an upstanding, arcuately curved, obliqued, plow surface surface which faces rearwardly so that plowing takes place along the swath cultivated by the rotor blades, only when the tiller is moved rearwardly along its path.

The plow is provided with a tapered leading edge proximate the frame and a trailing, rearward facing, plowing edge, which is proximate the trailing edge of the foot guard and the plow inclines upwardly from trailing to leading edge for streamlined action during forward movement of the tiller. Upon manual, or power retraction along the path, pressure may be exerted on the elongated handle so that the trailing, plowing edge, and the trailing, plowing surface of the reversely directed plow penetrates more deeply into the ground than the depth of cultivation by the rotor blades, thereby forming a furrow of increased depth.

The threaded fastenings or brackets of the plow are so located that it extends obliquely of the path, or swath, cultivated by the rotor blades, to thereby throw dirt sidewise over into a path in parallelism with the cultivated swath.

DESCRIPTION OF A PREFERRED EMBODIMENT

Figure 1:
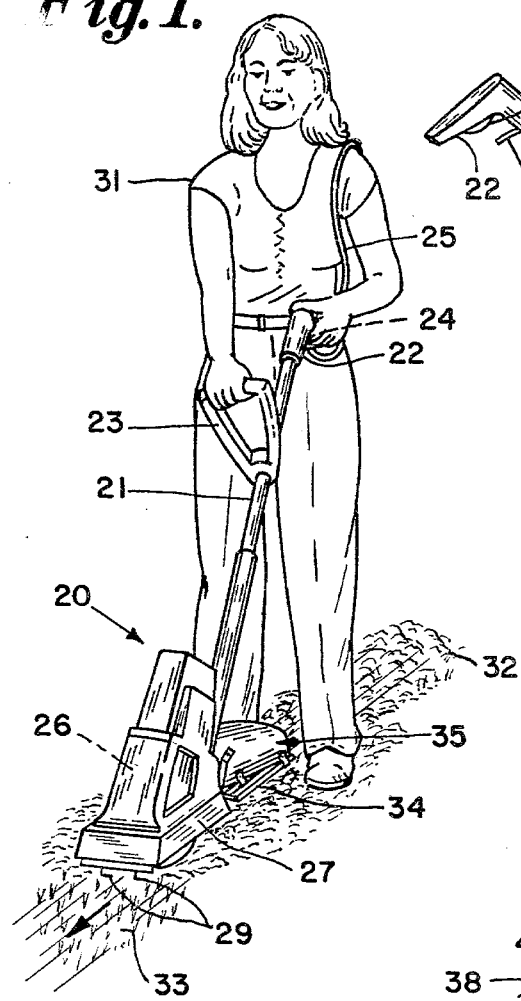
FIG. 1 is a perspective view showing the rotor tiller of the invention cultivating a swath in crusted soil with the plow of the invention trailing therebehind.
Figure 2:
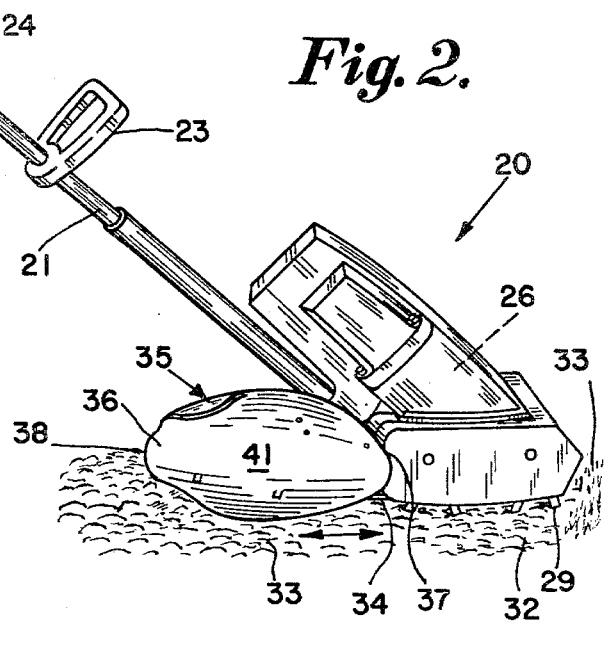
FIG. 2 is a side elevation on a larger scale showing the tiller blades propelling and digging while the plow trails in the cultivated path without penetrating the soil.
Figure 4:
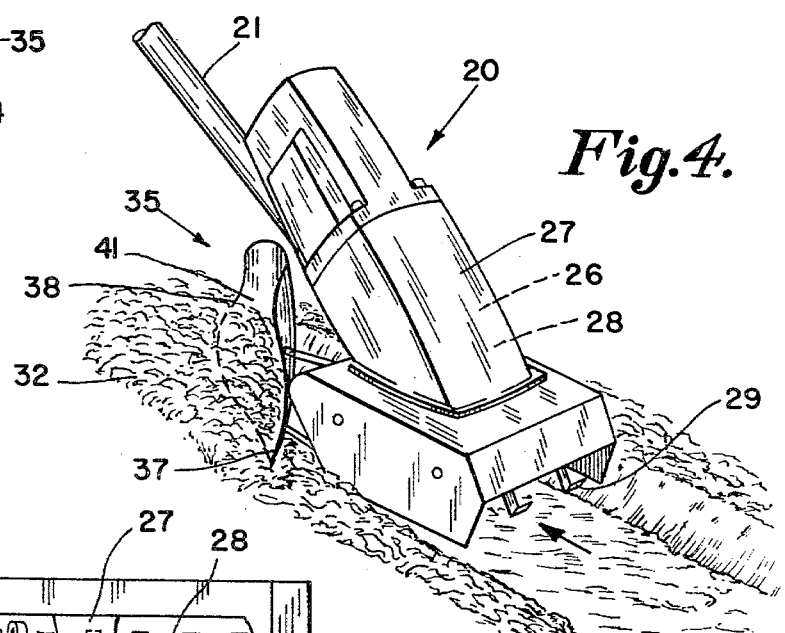
FIG. 4 is a view similar to FIG. 2 but showing the tiller with the handle pressed downwardly and being manually retracted to plow a furrow along the swath cultivated by the rotor blades.
Figure 3:
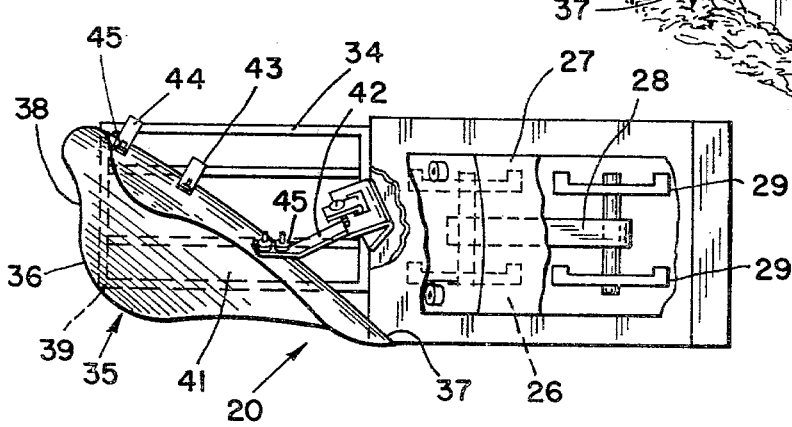
FIG. 3 is a top plan view, of the tiller shown in FIGS. 1 and 2, with parts broken away, and showing the oblique mounting of the plow in rear of the tiller.

As shown in the drawing, a conventional, commercially available, walking cultivator, or rotor tiller, 20 includes the elongated handle 21 with pistol grip 22, intermediate hand grip 23, trigger control switch 24, and electric cord 25 for the electric motor power means 26. The handle 21 of the power-operated tiller 20, extends upwardly and rearwardly from the frame, or housing, 27 which encloses the electric motor 26 and the motor, operably connected by a suitable power train 28, rotates the two pairs of tiller blades, or tines. As also shown in the drawing the tiller blades 29 rotate in vertical planes, on horizontal axes.

The operator 31 walks behind the rotor tiller 20, as shown in FIG. 1, guiding the device by the handle as the rotating tiller blades 29 cultivate a swath 32 in crusted soil 33 while propelling the tiller unidirectionally in a path of advance without push or pull by the operator 31. A foot guard 34, of skeletonized metal is affixed to the housing 27 to follow behind the tiller resting on the soil and preventing the feet of the operator from approaching too close to the blades 29.

The plow 35 of the invention is preferably formed of sheet metal 36 arcuately bent into curved cross section and having a tapered leading edge 37, proximate the housing 27, and a curved trailing plowing edge 38, proximate the trailing terminus 39 of the foot guard. The curved trailing edge 38, which is the leading edge when the tiller is moved rearwardly for plowing a furrow, is located along the central longitudinal axis of the path of advance of the tiller, the plow inclining upwardly and outwardly therefrom to the higher level of the leading edge 37 so that dirt plowed is guided upwardly and sidewise over into a path alongside, and in parallelism with, the path cultivated by the rotor blades. Thus the plow 35 is oblique to the path of advance or retraction of the tiller, and is normally upstanding above the soil 33 and above the foot guard, or support, 34 of the tiller.

As the tiller is handle guided, and rotor blade propelled forwardly to create a cultivated swath 32 in the soil 33, the streamlined mounting of the plow 35 causes it to ride freely, with no resistance, to advance, or strain on the motor 26. When the operator 31 presses downwardly on the handle and pulls the tiller 20 rearwardly, along the cultivated swath 32 the edge 38 penetrates more deeply into the earth and retraction creates a plowed furrow of predetermined depth depending on handle pressure and soil condition.

The upstanding, trailing, plowing surface 41, of plow 35, faces rearwardly to to produce the plowing effect only during retraction of the tiller. The elongated sheet metal plow blade 35 is preferably attachable and detachable on the housing 27 and foot guard 34 by means of the three brackets 42, 43 and 44 each having threaded fastening mechanism such the bolts and nuts 45 for ready removal or attachment.

The rotor tiller could be actuated by a gasoline motor and the plow 35 could be affixed by welding or built into the tiller at the factory still remaining within the scope of the invention. The particular rotor tiller depicted is the Black & Decker Electric Mini-tiller Model 8350 made by Black & Decker, Towson, Md. 21204.

I claim:

1. A walking type, power operated, garden tiller having:
   a plurality of rotatable blades for tilling the ground to loosen crusted soil, said blades being rotatable in vertical planes on horizontal axes:
   a motor on said tiller operably connected to rotate said blades and advance said tiller unidirectionally while tilling a cultivated path in said ground;
   a rearwardly inclined handle extending upwardly from said motor for guiding said tiller;
   and a plow, affixed to said tiller in rectilinear alignment in rear of said rotatable blades and oblique to the vertical planes of rotation of said blades, said plow having a tapered forward, or leading edge, an upstanding rearward or trailing, plowing edge and an upstanding, trailing, concave, plowing surface facing rearwardly whereby said plow is affixed to normally ride forwardly above ground level but faces rearwardly of the path of advance of said tiller to plow a furrow along said path when said tiller is manually retracted along said cultivated path.

2. A handle-guided, power operated, garden tiller, as specified in claim 1 wherein:
   said tiller includes a trailing foot guard extending generally horizontally rearwardly therefrom and said plow is mounted on said tiller to extend rearwardly therefrom above said foot guard and oblique thereto;
   whereby said plow rides along above the path tilled by said blades during power operated forward movement of said tiller but penetrates its trailing, plowing edge to a greater depth in said earth than the depth of said cultivated path when downward pressure is exerted on the handle of said tiller during manual retraction thereof along said path.

3. A handle guided, power operated garden tiller as specified in claim 1 wherein:
   said plow includes a plurality of brackets and threaded fastening mechanisms affixing it to said tiller with said leading, or forward, edge at a higher level than said trailing or rearward plowing edge to enable said plow to ride along said path in the direction of advance without penetrating the ground.

4. A power rotor tiller of the walking cultivator type having a frame with an elongated handle extending rearwardly and upwardly therefrom for guidance by a walking operator, a motor supported in said frame, rotary tiller blades, rotatable in vertical planes on horizontal axes located forwardly of said handle for cultivating a swath of ground as said tiller advances forwardly, said tiller characterized by:
   a rearwardly facing, curved, plow of sheet material, affixed to said frame in rear of and rectinlinearly aligned with said rotary tiller blades to extend obliquely of the vertical planes thereof, said plow having a tapered leading edge, a trailling rearward-facing, plowing, edge and a trailing, rearward-facing, concave plowing surface, said plow being affixed to said tiller with said leading edge at a higher level than the level of said trailing edge whereby said plow normally rides along said ground with said plowing surface angularly disposed to said ground and inclining upwardly from said trailing plowing edge to said leading edge to present minimum resistance when said tiller moves forwardly but to cause the said trailing edge to penetrate deeply to create a furrow when said tiller is drawn rearwardly along its tilled path.

5. A power rotor tiller as specified in claim 4 wherein:
   said tiller includes a foot guard extending substantially horizontally rearwardly therefrom and said plow is affixed to said frame and to said foot guard to extend rearwardly above, and oblique to said foot guard by a plurality of brackets, each including a threaded fastening member, for ready attachability and detachability.

6. A walking type, power-operated, rotor tiller having rotatable tiller blades rotated unidirectionally in vertical planes on horizontal axes to advance said tiller along a path while cultivating a swath of ground, and a handle extending rearwardly and upwardly from said tiller blades for guidance, said tiller characterized by;
   an elongated sheet metal, plow blade, having a tapered leading edge, an upstanding, arcuately-curved, rearward facing, concave plowing surface and an upstanding, rearward-facing, trailing, plowing edge, affixed to said tiller in rear of, and directly behind, said tiller blades to extend obliquely across the vertical planes of rotation of said tiller blades and face rearwardly of said tiller whereby said plow plows a furrow along said path only when said tiller is manually retracted along said path.

* * * * *